United States Patent
Kim

(10) Patent No.: US 10,215,844 B2
(45) Date of Patent: Feb. 26, 2019

(54) RADAR ALIGNMENT APPARATUS AND METHOD OF CONTROLLING THE SAME

(71) Applicant: Hyundai Mobis Co., Ltd., Seoul (KR)

(72) Inventor: Se yoon Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 460 days.

(21) Appl. No.: 14/966,399

(22) Filed: Dec. 11, 2015

(65) Prior Publication Data

US 2016/0187466 A1    Jun. 30, 2016

(30) Foreign Application Priority Data

Dec. 31, 2014 (KR) .......................... 10-2014-0195439

(51) Int. Cl.
| | |
|---|---|
| *G01S 7/40* | (2006.01) |
| *G01S 13/87* | (2006.01) |
| *G01S 13/93* | (2006.01) |

(52) U.S. Cl.
CPC ............ *G01S 7/4026* (2013.01); *G01S 13/87* (2013.01); *G01S 13/931* (2013.01);
(Continued)

(58) Field of Classification Search
CPC ...... G01S 7/4026; G01S 13/87; G01S 13/931; G01S 2007/403; G01S 2013/9378; G01S 13/9389
(Continued)

(56) References Cited

U.S. PATENT DOCUMENTS

| | | | |
|---|---|---|---|
| 2004/0027272 A1 | 2/2004 | Richardson et al. | |
| 2006/0164294 A1* | 7/2006 | Gottwald | G01S 13/878 |
| | | | 342/70 |

(Continued)

FOREIGN PATENT DOCUMENTS

| | | |
|---|---|---|
| CN | 102680952 | 9/2012 |
| CN | 102749626 | 10/2012 |

(Continued)

OTHER PUBLICATIONS

First Office Action dated Sep. 21, 2017, issued in Chinese Patent Application No. 201510918736.1 (with unverified English translation).

*Primary Examiner* — Frank J McGue
(74) *Attorney, Agent, or Firm* — H.C. Park & Associates, PLC

(57) ABSTRACT

A method of controlling a radar alignment apparatus includes calculating a first target information by using a first radar and a second target information by using a second radar spaced apart from the first radar on a vehicle by a predetermined interval. The method includes determining whether the first target and the second target are a same target based on comparing at least some of the first target information with the second target, and determining whether misalignment exists in at least one of the first radar and the second radar based on a comparison of a first angle included a first target information with a second angle included in a second target information, correcting the misalignment by using the first target information and the second target information when it is determined that the misalignment exists in at least one of the first radar and the second radar.

9 Claims, 4 Drawing Sheets

(52) U.S. Cl.
CPC . *G01S 2007/403* (2013.01); *G01S 2013/9378* (2013.01); *G01S 2013/9389* (2013.01)

(58) Field of Classification Search
USPC .......................................................... 342/70
See application file for complete search history.

(56) References Cited

U.S. PATENT DOCUMENTS

| | | | |
|---|---|---|---|
| 2006/0262009 A1* | 11/2006 | Watanabe | G01S 7/36 342/159 |
| 2011/0153268 A1* | 6/2011 | Jordan | G01S 13/931 702/151 |
| 2012/0235851 A1 | 9/2012 | Park et al. | |
| 2012/0313807 A1* | 12/2012 | Yanagi | G01S 7/04 342/59 |

FOREIGN PATENT DOCUMENTS

| | | |
|---|---|---|
| JP | 2010-0249613 | 11/2010 |
| KR | 10-2013-0000202 | 1/2013 |

\* cited by examiner

RADAR ALIGNMENT APPARATUS AND METHOD OF CONTROLLING THE SAME

CROSS-REFERENCE TO RELATED APPLICATIONS

The present application claims priority from and the benefit of Korean Patent Application Number 10-2014-0195439, filed Dec. 31, 2014, which is hereby incorporated by reference for all purposes as if fully set forth herein.

BACKGROUND

Field

Exemplary embodiments relate to a radar alignment apparatus and a method of controlling the same, and more particularly, to a radar alignment apparatus for a vehicle, which is configured to share information about a target detected by a one or more radars mounted in and/or on a vehicle and correcting misalignment when the misalignment is detected by the one or more radars, and a method of controlling the same.

Discussion of the Background

In general, an adaptive cruise control (ACC) system of a vehicle is a system that automatically controls the traveling speed of the vehicle through a position of and a distance to a vehicle detected by a radar mounted at a front side of the vehicle to appropriately accelerate and decelerate, thereby maintaining an appropriate distance from the front vehicle. Recently, a system of securing safe driving by detecting a position of and a distance to a vehicle entering or approaching a lateral side of the corresponding vehicle with a rear side-mounted radar has been combined with the ACC system previously described.

When a radar is mounted at a rear side of a vehicle, a position of and a distance to another vehicle positioned at a lateral side of the corresponding vehicle are detected in a system used in an advanced drive assist display (ADAD), so that an alignment for directionality of the radar and an analysis of an analysis coordinate value are very important.

The angle accuracy required by the radar for the vehicle only permits an error of less than about 1° to 2°, and the radar mounting angle or measurement angle may become misaligned during prolonged operation. Misalignment of the radar occurs, when the radar mounting angle or measurement angle is misaligned. This causes generated, travel information about a target or an opposite vehicle to be inaccurate. Thus, a warning may be generated in error or not generated when needed. In general, radar is corrected by verifying the mounting or measurement angle and performance regularly or as necessary, but the radar for a vehicle is operated without the verification, so that the radar itself needs to detect and measure a misalignment state and correct a mounting angle for a lifespan of a vehicle.

A method for correcting the error of the mounting angle of a radar of a vehicle uses data from a vehicle speed sensor, a yaw rate sensor, and the radar. However, when the mounting angle error is corrected through the vehicle speed sensor and the yaw rate sensor, it is difficult to accurately determine this angle because the left and right targets of the radar are positioned too close to the radar.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a radar alignment apparatus for a vehicle, and a method of controlling the same.

Particularly, the present disclosure has been made in an effort to detect misalignment with respect to a horizontal direction of a radar, calculate a correction value, and automatically correct the misalignment of the radar.

Additional aspects will be set forth in the detailed description which follows, and, in part, will be apparent from the disclosure, or may be learned by practice of the inventive concept.

An exemplary embodiment discloses a method of controlling a radar alignment apparatus, including calculating a first target information comprising a first distance to, a first speed, and an first angle of a first target by using a first radar provided on a vehicle, calculating a second target information comprising a second distance to, a second speed, and an angle of a second target by using a second radar provided on the vehicle and spaced apart from the first radar by a predetermined interval, comparing the first distance and the first speed included in the first target information with the second distance and the second speed included in the second target information, determining whether the first target and the second target are a same target based on the comparison of the first distance with the second distance and the first speed with the second speed, comparing the first angle included in the first target information with the second angle included in the second target information when it is determined that the first target and the second target are the same target, determining whether misalignment exists in at least one of the first radar and the second radar based on the comparison of the first angle with the second angle, and correcting the misalignment by using the first distance included in the first target information and the second distance included in the second target information when it is determined that the misalignment exists in at least one of the first radar and the second radar.

An exemplary embodiment also discloses apparatus for aligning radars, including, a first radar and a second radar provided on a vehicle and spaced apart from each other by a predetermined interval, the first and second radars radiate radio waves for detecting a first target and a second target, a receiving unit configured to receive a first signal of the radio wave radiated by the first radar and reflected from the first target, and a second signal of the radio wave radiated by the second radar and reflected from the second target, a target information calculating unit configured to calculate a first target information comprising a first distance to, a first speed, and a first angle of the first target, and a second target information comprising a second distance to, a second speed, and a second angle of the second target based on the first and second signals received by the receiving unit, a target information comparing unit configured to compare the first distance and the first speed included in the first target information with the second distance and the second speed included in the second target information, the target information comparing unit also configured to determine whether the first target and the second target are a same target, and an alignment correcting unit configured to compare the first angle included in the first target information with the second angle included in the second target information and determine whether misalignment exists in at least one of the first radar or the second radar when it is determined that the first target and the second target are the same target, and calculate a correction value for correcting the misalignment by using the first distance included in the first target information with the second distance included in the second target information when it is determined that misalignment exists in at least one of the first radar and the second radar.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
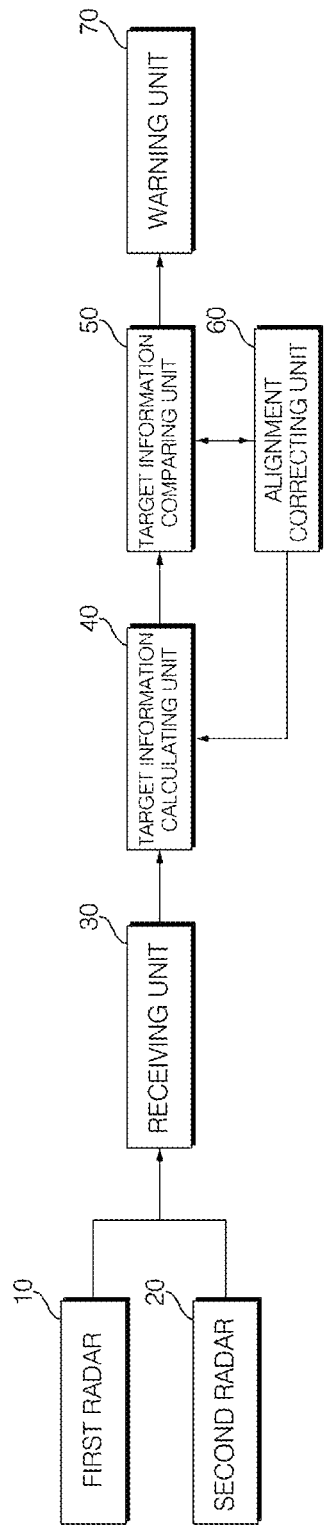
FIG. 1 is a block diagram of a radar alignment apparatus according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of, regions, components, elements, etc., may be exaggerated for clarity and descriptive purposes. Also, like reference numerals denote like elements.

When an element is referred to as being "on," "connected to," or "mounted on" another element, it may be directly on, connected to, or coupled to the other element or layer or intervening elements may be present. When, however, an element or layer is referred to as being "directly on," "directly connected to," or "directly mounted on" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, and/or sections, these elements, components, regions, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments will be described with reference to the drawings explaining a radar alignment apparatus for a vehicle and a method of controlling the same according to exemplary embodiments.

A radar alignment apparatus for a vehicle and a method of controlling the same may be modified by those skilled in the art, and in the present exemplary embodiment, a radar alignment apparatus for a vehicle and a method of controlling the same will be described.

FIG. 1 is a block diagram of a radar alignment apparatus according to an exemplary embodiment.

Referring to FIG. 1, a radar alignment apparatus may include a first radar 10, a second radar 20, a receiving unit 30, a target information calculating unit 40, a target information comparing unit 50, and an alignment correcting unit 60.

Figure 2:
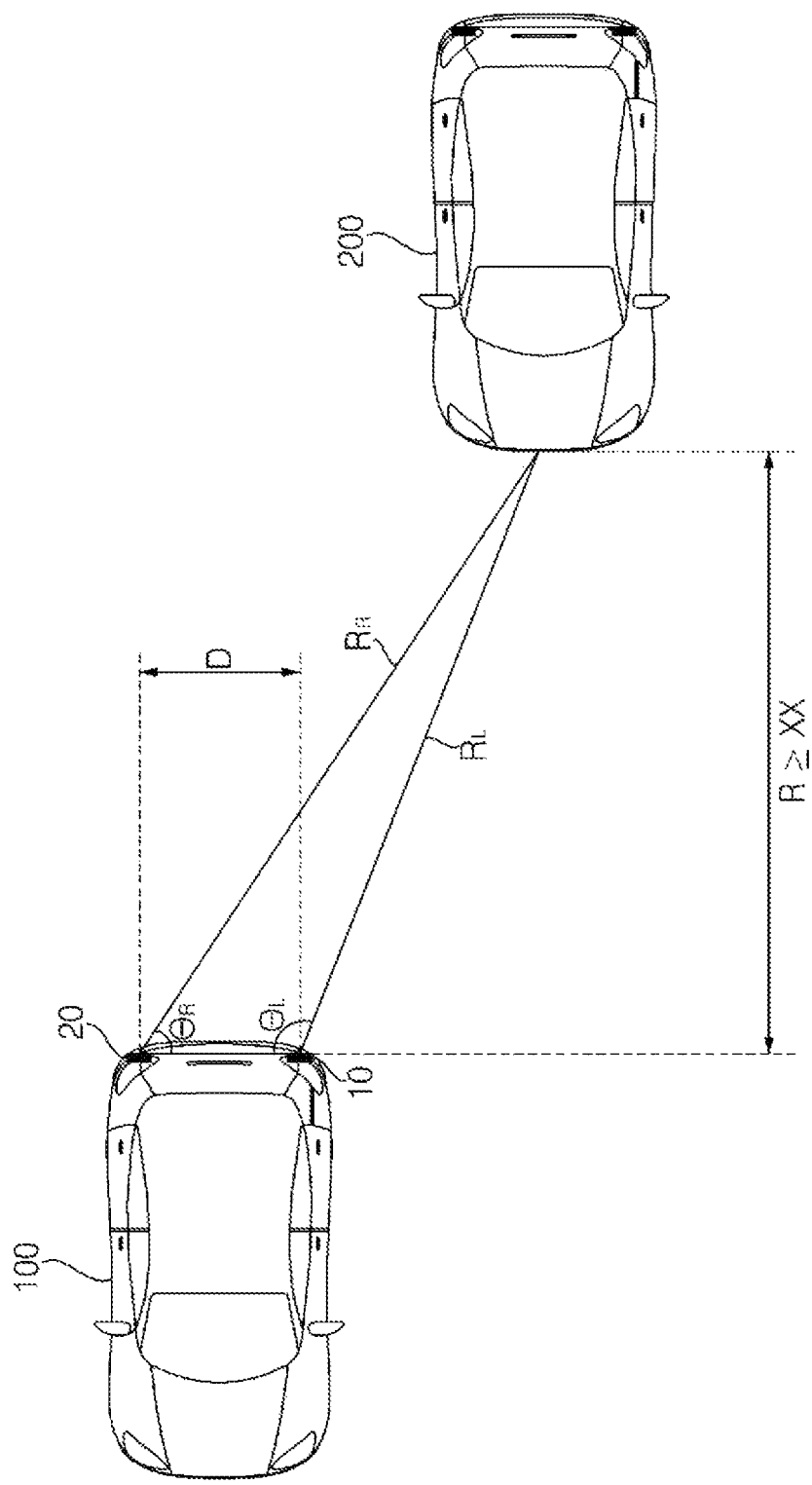
FIG. 2 illustrates an example of calculation of target information by the radar alignment apparatus according to an exemplary embodiment.

The first radar 10 and the second radar 20 may be mounted in and/or on the vehicle (See FIG. 2). Further, the first radar 10 and the second radar 20 may be spaced apart from each other by a predetermined interval.

The first radar 10 may be provided at a rear-left side of the vehicle, and the second radar 20 may be provided at a rear-right side of the vehicle.

The first radar 10 may radiate radio waves to a surrounding area of the vehicle. The second radar 20 may also radiate radio waves to a surrounding area of the vehicle. In this case, the first radar 10 and the second radar 20 may be set to radiate radio waves within a predetermined range.

Each of the radio waves radiated by the first radar 10 and the second radar 20 may be reflected by an obstacle (e.g., a second vehicle 200) positioned around the vehicle.

The receiving unit 30 may receive the radio waves, which are radiated from the first radar 10 and the second radar 20 and reflected by a target positioned around the vehicle. For example, the receiving unit 30 may receive a signal of the radio wave which is radiated by the first radar 10 and reflected from a first target, and a signal of the radio wave which is radiated by the second radar 20 and reflected from a second target. Here, the first target may be the same as or different from the second target. One or more receiving units 30 may be provided at each of the first radar 10 and the second radar 20.

The target information calculating unit 40 may calculate target information based on a signal received by the receiving unit 30. Particularly, the target information calculating unit 40 may calculate target information including a distance to the target, a speed of the target, and an angle of the target to the vehicle based on the signal received by the receiving unit 30. For example, the target information calculating unit 40 may calculate first target information including a first distance to $R_L$, a first speed, and a first angle $\theta_1$ of the first target. Further, the target information calculating unit 40 may calculate second target information including a second distance to $R_R$, a second speed, and a second angle $\theta_2$ of the second target based on the signal of the radio wave, which is radiated from the second radar and reflected and returned by the second target.

The target information comparing unit 50 may determine whether the first target is the same as the second target by comparing the first distance $R_L$ and the first speed included in the first target information and the second distance $R_R$ and the second speed included in the second target information.

When the difference between the first distance $R_L$ included in the first target information and the second distance $R_R$ included in the second target information is equal to or smaller than a first reference value, and when a difference between the first speed included in the first target information and the second speed included in the second target information is equal to or smaller than a second reference value, the target information comparing unit 50 may determine that the first target is the same as the second target.

The alignment correcting unit 60 may determine whether misalignment exists in at least one of the first radar 10 and the second radar 20. Particularly, when the target information comparing unit 50 determines that the first target is the same as the second target, the alignment correcting unit 60 may compare the first angle $\theta_1$ included in the first target information and the second angle $\theta_2$ included in the second target information, and determine whether misalignment exists in the first radar 10 or the second radar 20. For example, when a difference between the first angle $\theta_1$ included in the first target information and the second angle $\theta_2$ included in the second target information is equal to or larger than a third reference value, the alignment correcting unit 60 may determine that the misalignment exists in the first radar 10 or the second radar 20.

When the alignment correcting unit 60 determines that the misalignment exists in at least one of the first radar 10 and the second radar 20, the alignment correcting unit 60 may calculate a correction value for correcting the misalignment by using the distance included in the first target information and the distance included in the second target information.

When it is assumed that the first target is the same as the second target, the alignment correcting unit 60 may determine whether a smaller value between the first distance $R_L$ included in the first target information and the second distance $R_R$ included in the second target information is equal to or larger than a reference distance XX. As illustrated in FIG. 2, the alignment correcting unit 60 (shown in FIG. 1) may determine whether a vertical distance R between the first vehicle 100 and the target (e.g. a second vehicle 200 behind the first vehicle 100) is equal to or larger than the reference distance XX.

When the first radar 10 and the second radar 20 radiate the radio waves, and the target is positioned at a distance smaller than the reference distance XX, the possibility that the radio wave is sporadically reflected is high, and a large error may be generated in the target information.

When the alignment correcting unit 60 determines that each of the first distance $R_L$ included in the first target information and the second distance $R_R$ included in the second target information is equal to or larger than the reference distance, the alignment correcting unit 60 may determine whether the number of times of determination that the misalignment exists in at least one of the first radar 10 and the second radar 20 is equal to or larger than a predetermined number of times. The alignment correcting unit 60 may perform the correction of the misalignment only when the number of times of determination that the misalignment exists in the at least one of the first radar 10 and the second radar 20 is equal to or larger than the predetermined number of times, thereby improving reliability. The reference distance XX may be set to have a value corresponding to a predetermined ratio or more compared to maximum detected distances of the first radar 10 and the second radar 20.

The alignment correcting unit 60 may calculate a first calculated angle $\theta_L$ of the first target to the first radar 10 and a second calculated angle $\theta_R$ of the second target to the second radar 20 by using the first distance $R_L$ included in the first target information, the second distance $R_R$ included in the second target information, and the interval D between the first radar 10 and the second radar 20 with the law of cosines. For example, the alignment correcting unit 60 may calculate the first calculated angle $\theta_L$ of the first target to the first radar 10 and the second calculated angle $\theta_R$ of the second target to the second radar 20 by using a triangulation method.

The alignment correcting unit 60 may calculate a first correction value and a second correction value. The first correction value may be the difference between the first calculated angle $\theta_L$ of the first target to the first radar 10 and the first angle $\theta_1$ included in the first target information, and the second correction value may be a difference between the second calculated angle $\theta_R$ of the second target to the second radar 20 and the second angle $\theta_2$ included in the second target information. When the first correction value and the second correction value are calculated, the alignment correcting unit 60 may correct the first angle $\theta_1$ included in the first target information by using the first correction value, and correct the second angle $\theta_2$ included in the second target information by using the second correction value.

Before correcting the first angle $\theta_1$ included in the first target information and the second angle $\theta_2$ included in the second target information by using the first correction value and the second correction value, respectively, the alignment correcting unit 60 may accumulate the first correction value and the second correction value by a predetermined number of times, and filter the accumulated first correction values and second correction values according to a predetermined reference value. The alignment correcting unit 60 may provide the first correction value and the second correction value before or after the filtering to the target information calculating unit 40 and/or the target information comparing unit 50. The target information calculating unit 40 may use the first correction value and the second correction value when calculating the first target information and the second target information. The target information comparing unit 50 may correct the first angle $\theta_1$ included in the first target information and the second angle $\theta_2$ included in the second target information by using the first correction value and the second correction value, respectively.

When the target information comparing unit 50 determines that the first target is the same as the second target, a warning unit 70 may output a warning message. The warning message may be a message corresponding to the first target information and the second target information, and may have at least one type of warning among a visual type, an audible type, and a tactile type. For example, when a first distance $R_L$ (or a lateral distance calculated from the first distance $R_L$) to the first target is smaller than a predetermined distance, the warning unit 70 may generate a beep sound through a speaker of the vehicle and the like. As another example, when a second distance $R_R$ (or a lateral distance calculated from the second distance $R_R$) to the first target is smaller than a predetermined distance, the warning unit 70 may display a text notifying a danger situation through a display of the vehicle.

FIG. 2 illustrates an example of the calculation of target information by the radar alignment apparatus according an exemplary embodiment. For convenience of reader, but by no means limiting, one or more receiving units 30 are provided at each of the first radar 10 and the second radar 20 mounted in and/or on a first vehicle 100, and a distance R between a second vehicle 200 and the first vehicle 100 is equal to or larger than the reference distance XX.

Referring to FIG. 2, the first radar 10 and the second radar 20 may be mounted on the first vehicle 100 while being spaced apart from each other by a predetermined interval D.

A second vehicle 200 travelling behind (e.g., diagonally behind) the first vehicle 100 may be detected as a target by the first radar 10 and the second radar 20 mounted on the first vehicle 100. More specifically, the second vehicle 200 may be detected as a first target by the first radar 10, and detected as a second target by the second radar 20. In other words, one target may be detected by each of the first radar 10 and the second radar 20.

The target information calculating unit 40 may calculate first target information about the second vehicle 200 based on a signal that is radiated from the first radar 10, reflected, and received by the receiving unit 30. The first target information may include a first distance $R_L$ to the second vehicle 200, a first angle $\theta_1$, and a first speed of the second vehicle 200. The first angle $\theta_1$ may be measured from a first line between the first radar 10 and the second radar 20 and a second line measured from the first radar 10 to the center of the second vehicle 200. The second line is not limited to being measured from the center of the second vehicle 200 and may be measured from the first radar 10 to any position on the second vehicle 200 (e.g., the closest point of the second vehicle 200 to the first radar 10).

The target information calculating unit 40 may calculate second target information about the second vehicle 200 based on a signal that is radiated from the second radar 20, reflected, and received by the receiving unit 30. The second target information may include a second distance $R_R$ to another vehicle 200, a second angle $\theta_2$, and a second speed of the second vehicle 200. The second angle $\theta_2$ may be measured from the first line between the first radar 10 and the second radar 20 and a third line measured from the second radar 20 to the center of the second vehicle 200. The third line is not limited to being measured from the center of the second vehicle 200 and may be measured from the second radar 20 to any position on the second vehicle 200 (e.g., the closest point of the second vehicle 200 to the second radar 20).

The target information comparing unit 50 may determine whether the first target is the same as the second target based on comparing the first distance $R_L$ to the second vehicle 200 included in the first target information with the second distance $R_R$ to the second vehicle 200 included in the second target information and comparing the first speed of the second vehicle 200 included in the first target information with the second speed of the second vehicle 200 included in the second target information. When the first distance $R_L$ to the second vehicle 200 included in the first target information is the same as the second distance $R_R$ to the second vehicle 200 included in the second target information, and the first speed of the second vehicle 200 included in the first target information is the same as the second speed of the second vehicle 200 included in the second target information, the target information comparing unit 50 may determine that the first target is the same as the second target.

The alignment correcting unit 60 may correct misalignment generated in at least one of the first radar 10 and the second radar 20 when the target information comparing unit 50 determines that the first target is the same as the second target.

When a difference between an absolute value of the first angle $\theta_1$ and the second angle $\theta_2$ (e.g., $\theta_1 - \theta_2$) calculated by the first radar 10 and the second radar 20, respectively, is equal to or larger than a predetermined third reference value, the alignment correcting unit 60 may determine that the misalignment exists in at least one of the first radar 10 and the second radar 20.

The alignment correcting unit 60 may calculate a first correction value and a second correction value when determining that the misalignment exists in at least one of the first radar 10 and the second radar 20. Here, the first correction value is a value for correcting the first angle $\theta_1$ included in the first target information, and the second correction value is a value for correcting the second angle $\theta_2$ included in the second target information.

The alignment correcting unit 60 may calculate each of the first correction value and the second correction value based on the first distance $R_L$ included in the first target information, the second distance $R_R$ included in the second target information, and the interval D between the first radar 10 and the second radar 20.

The alignment correcting unit 60 may calculate the first correction value and the second correction value by using Equation 1 below.

$$\cos\theta_R = \frac{R_R^2 + D^2 + R_L^2}{2R_R D} \qquad \text{Equation 1}$$

$$\cos\theta_L = \frac{R_L^2 + D^2 + R_R^2}{2R_L D}$$

Referring to FIG. 2, $\theta_L$ of Equation 1 may be a calculated first angle of the second vehicle 200 to the first radar 10, and $\theta_R$ of Equation 1 may be a calculated second angle of the second vehicle 200 to the second radar 20.

The alignment correcting unit 60 may calculate the first correction value by determining the difference between the first angle $\theta_1$ included in the first target information and the calculated first angle $\theta_L$ of the second vehicle 200 to the first radar 10 (i.e., $\theta_1 - \theta_L$).

The alignment correcting unit 60 may calculate the second correction value by determining the difference between the second angle $\theta_2$ included in the second target information and the second calculated angle $\theta_R$ of the second vehicle 200 to the second radar 20 (i.e., $\theta_2 - \theta_R$).

The alignment correcting unit 60 may provide the first correction value ($\theta_1 - \theta_L$) and the second correction value ($\theta_2 - \theta_R$) to the target information calculating unit 40.

The target information calculating unit 40 may correct the first angle $\theta_1$ included in the first target information by using the first correction value ($\theta_1 - \theta_L$) provided from the alignment correcting unit 60. For example, the target information calculating unit 40 may include a value ($\theta_L$) obtained by subtracting the first correction value ($\theta_1 - \theta_L$) from the first angle $\theta_1$ included in the first target information in the first target information.

The target information calculating unit 40 may correct the second angle $\theta_2$ included in the second target information by using the second correction value ($\theta_2 - \theta_R$) provided from the alignment correcting unit 60. For example, the target information calculating unit 40 may include a value ($\theta_R$) obtained by subtracting the second correction value ($\theta_2 - \theta_R$) from the second angle $\theta_2$ included in the second target information in the second target information.

The alignment correcting unit 60 may determine whether another vehicle 200 is a target positioned at a point spaced apart from the vehicle by a predetermined reference distance or more. Here, when a near distance target is spaced from the vehicle by less than the reference distance, a ratio by which the radio wave radiated by each of the first radar 10 and the second radar 20 is excessively and sporadically reflected by the corresponding near distance target. This may cause a large error to be generated in the first correction value and the second correction value. Thus, the reliability may deteriorate in the radar system.

As described above, the alignment correcting unit 60 may accumulate and filter each of the first correction value and the second correction value in order to decrease error, and filter information for the target information calculating unit 40 and the target information comparing unit 50.

When the target information comparing unit 50 determines that the targets detected by the first radar 10 and the second radar 20 are the same as each other, the warning unit 70 may transmit a warning signal to a user. When a distance (e.g., a first distance $R_L$, a second distance $R_R$, or a lateral distance calculated from one of the radars) to the same target, is smaller than a predetermined value, the warning unit 70 may transmit a warning signal.

Hereinafter, a method of controlling the radar alignment apparatus for the vehicle 100 according to an exemplary embodiment will be described with reference to FIGS. 3 and 4.

Figure 3:
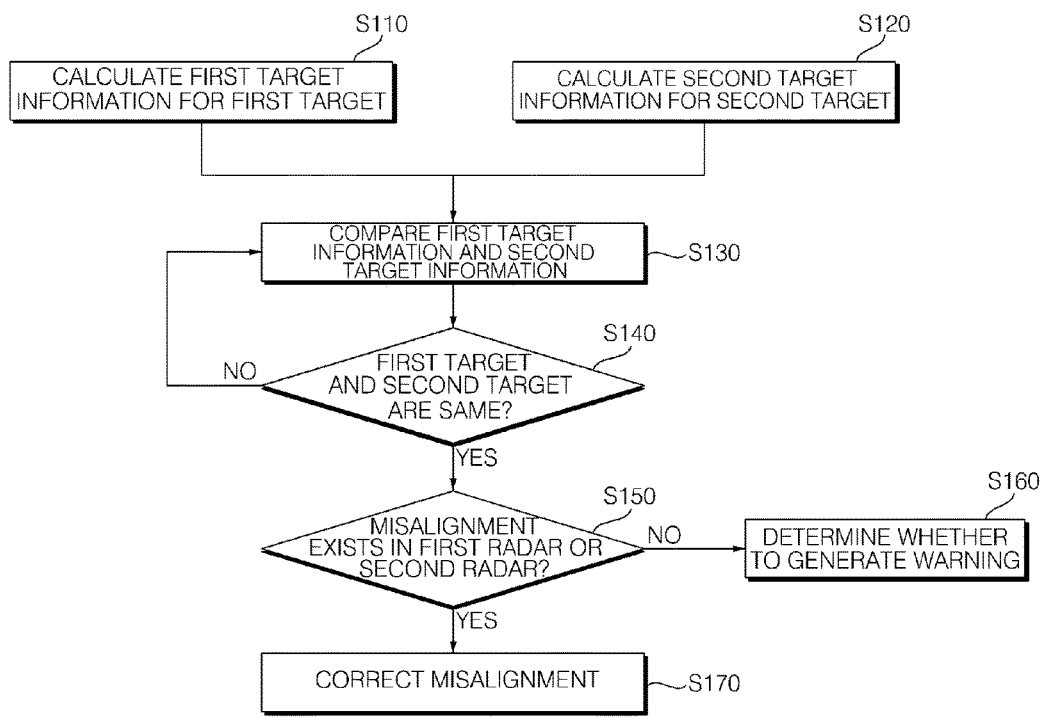
FIG. 3 is a flowchart of a method of controlling the radar alignment apparatus according to an exemplary embodiment.

FIG. 3 is a flowchart illustrating a method of controlling the radar alignment apparatus according to an exemplary embodiment.

Referring to FIG. 3, first target information about a first target may be calculated by using the first radar 10 provided on the first vehicle 100 (S110), and second target information about a second target is calculated by using the second radar 20, which is provided on the second vehicle 200 and spaced apart from the first radar 10 by a predetermined interval (S120). The first target information may include a first distance to $R_L$, a first speed, and a first angle $\theta_1$ of the first target, and the second target information may include a second distance to $R_R$, a second speed, and a second angle $\theta_2$ of the second target. Each of the first radar 10 and the second radar 20 may radiate a radio wave to the target, the receiving unit 30 may receive a signal reflected from the target, and the target information calculating unit 40 may calculate the first target information and the second target information based on the signal received by the receiving unit 30.

The target information comparing unit 50 may compare the first target information and the second target information provided from the target information calculating unit 40 (S130).

The target information comparing unit 50 may determine whether the first target detected by the first radar 10 is the same as the second target detected by the second radar 20 based comparing the first target information with the second target information (S140). When the first target detected by the first radar 10 is the same as the second target detected by the second radar 20, the first distance $R_L$ (or a lateral distance calculated from the first distance $R_L$) and the first speed included in the first target information are the same as the second distance $R_R$ (or a lateral distance calculated from the second distance $R_R$) and the second speed included in the second target information or have considerably similar values to those of the second distance $R_R$ and the second speed included in the second target information. For example, when a difference between the first distance $R_L$ (or a lateral distance calculated from the first distance $R_L$) included in the first target information and the second distance $R_R$ (or a lateral distance calculated from the second distance $R_R$) included in the second target information is equal to or smaller than a first reference value, and when a difference between the first speed included in the first target information and the second speed included in the second target information is equal to or smaller than a second reference value, the target information comparing unit 50 may determine that the first target is the same as the second target.

When the target information comparing unit 50 determines that the first target is the same as the second target, the target information comparing unit 50 may compare the first angle $\theta_1$ included in the first target information and the second angle $\theta_2$ included in the second target information, and determine whether misalignment exists in the first radar 10 or the second radar 20 (S150). When the difference between the first angle $\theta_1$ included in the first target information and the second angle $\theta_2$ included in the second target information is equal to or larger than a third reference value, the target information comparing unit 50 may determine that the misalignment exists in the first radar 10 or the second radar 20. The target information comparing unit 50 may determine that at least one of the first radar 10 and the second radar 20 is distorted from a designed mounting angle to be misaligned.

When the difference between the first angle $\theta_1$ included in the first target information and the second angle $\theta_2$ included in the second target information is smaller than the third reference value, the target information comparing unit 50 may determine that the misalignment does not exist in the first radar 10 and the second radar 20.

When the target information comparing unit 50 determines that the misalignment does not exist in the first radar 10 and the second radar 20, the warning unit 70 may determine whether to generate a warning by using the distance included in the first target information or the second target information (S160).

When the target information comparing unit 50 determines that the misalignment exists in at least one of the first radar 10 and the second radar 20, the alignment correcting unit 60 corrects the misalignment by using the distance included in the first target information and the distance included in the second target information (S170). Operation S170 will be described in detail below with reference to FIG. 4.

Figure 4:
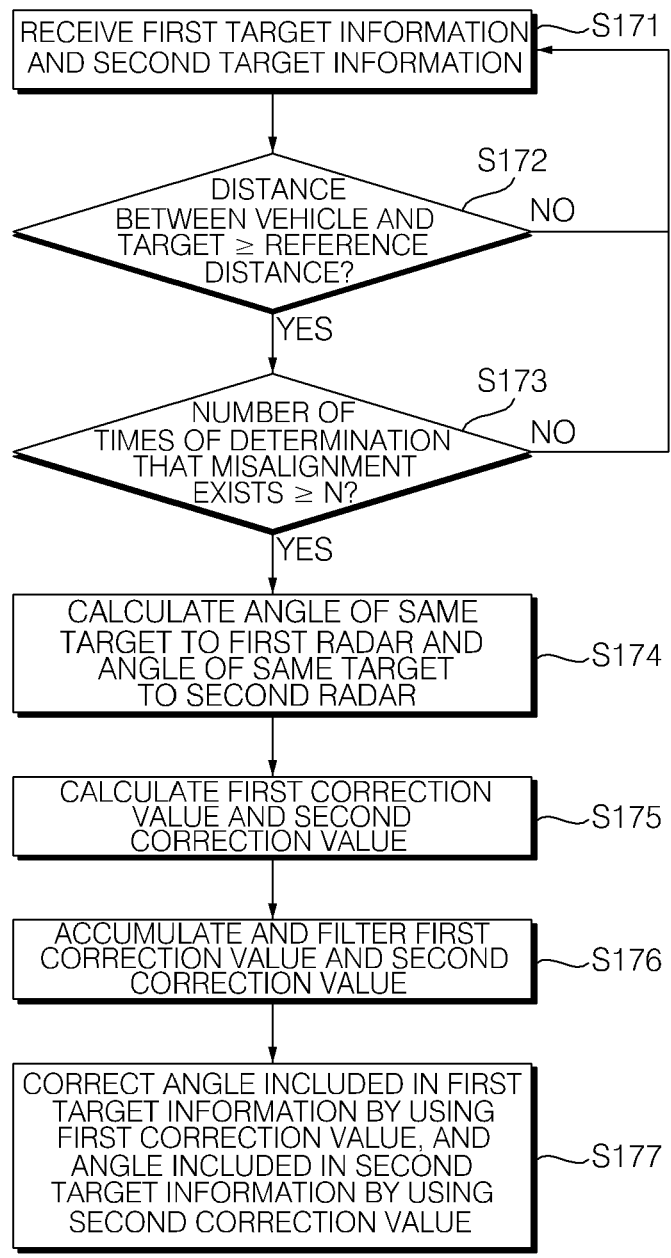
FIG. 4 illustrates an example of a process of calculating a correction value for correcting misalignment according to an exemplary embodiment.

FIG. 4 illustrates an example of a process of calculating a correction value for correcting misalignment according to an exemplary embodiment.

Referring to FIG. 4, when the target information comparing unit 50 determines that the misalignment exists in at least one of the first radar 10 and the second radar 20, the alignment correcting unit 60 may receive the first target information and the second target information from the target information calculating unit 40 (S171).

The alignment correcting unit 60 may determine whether a distance between the first vehicle 100 and the target is equal to or larger than a reference distance (S172). For example, the alignment correcting unit 60 may determine whether a smaller value (i.e., a lateral distance from the first vehicle or radars on the first vehicle to the target) between the first distance $R_L$ included in the first target information and the second distance $R_R$ included in the second target information is equal to or larger than a reference distance. Notably, when the misalignment is corrected based on the target information about a target excessively close to the first vehicle 100, it is difficult to calculate a reliable correction value. Thus, if the alignment correcting unit determines that the distance between the first vehicle 100 and the target (e.g., the second vehicle 200) is less than the reference distance (i.e., the distance between the first vehicle 100 and the target is not equal to or greater than the reference distance), then the method illustrated in FIG. 4 may return to step S171 described above.

When the alignment correcting unit 60 determines that each of the distances $R_L$ and $R_R$ included in the first target information and the distance included in the second target information is equal to or larger than the reference distance, the alignment correcting unit 60 may determine whether the number of times of determination that the misalignment exists in the first radar 10 or the second radar 20 is equal to or larger than a predetermined number N of times (S173). A process of accumulating the number of times of determination that the misalignment exists in the first radar 10 or the second radar 20 for the predetermined same target may be performed in advance. The target information comparing unit 50 may first determine whether the first target is the same as the second target in operation S140, and secondarily determine whether the first target is the same as the second target based on the number of times of determination that the misalignment exists in operation S173. The alignment correcting unit 60 may correct the misalignment only when the number of times of determination that the misalignment exists is equal to or larger than the predetermined number N of times, thereby improving reliability.

When the alignment correcting unit 60 determines that the number of times of determination that the misalignment exists in the first radar 10 or the second radar 20 is equal to or larger than the predetermined number of times, the alignment correcting unit 60 may calculate a first calculated angle $\theta_L$ of the same target to the first radar 10 and a second calculated angle $\theta_R$ of the same target to the second radar 20 (S174). The alignment correcting unit 60 may calculate each of a first calculated angle $\theta_L$ of the same target to the first radar 10 and a second calculated angle $\theta_R$ of the same target to the second radar 20 by substituting the first distance $R_L$ included in the first target information, the second distance $R_R$ included in the second target information, and the interval D between the first radar 10 and the second radar 20 according to the law of cosine law described above in Equation 1.

The alignment correcting unit 60 may calculate a first correction value and a second correction value (S175). The first correction value may be a difference between the first calculated angle $\theta_L$ of the first target to the first radar 10 and the first angle $\theta_1$ included in the first target information. The second correction value may be a difference between the second calculated angle $\theta_R$ of the second target to the second radar 20 and the second angle $\theta_2$ included in the second target information.

The alignment correcting unit 60 may accumulate and filter the first correction value and the second correction value (S176). However, operation S176 may be omitted as necessary.

The target information comparing unit 50 may correct the first angle $\theta_1$ included in the first target information and the second angle $\theta_2$ included in the second target information by using the first correction value and the second correction value, respectively (S177). The alignment correcting unit 60 may provide the first correction value and the second correction value to the target information calculating unit 40. The alignment correcting unit 60 may also provide the first correction value and the second correction value to the target information comparing unit 50. For example, the first correction value and the second correction value may be used in aforementioned operations S110, S120, S150, and the like. The target information calculating unit 40 may correct the first angle $\theta_1$ included in the first target information by using the first correction value and correct the second angle $\theta_2$ included in the second target information by using the second correction value. The correction of the first angle $\theta_1$ included in the first target information may correspond to the correction of the misalignment of the first radar 10. Further, the correction of the second angle θ1 included in the second target information may correspond to the correction of the misalignment of the second radar 20.

For example, when the first correction value is +1° and the first angle $\theta_1$ included in the first target information before the correction is 65°, the target information calculating unit 40 may correct the misalignment so as to have +66° by adding the first correction value of +1° to +65° that is the first angle $\theta_1$ included in the first target information before the correction. When the misalignment by −1° is generated in the first radar 10, the misalignment of the first radar 10 may be corrected by using the first correction value. The misalignment of the second radar 20 may be corrected by the same method.

Operation S176 may be performed until it is determined that a new misalignment exists in aforementioned operation S150.

According to the exemplary embodiment of the radar alignment apparatus for a vehicle and the method of controlling the same according to the present disclosure including the aforementioned configuration, it is possible to prevent an incorrect warning, a non-warning, or a late warning due to an incorrect measurement of travel information about a target or an opposite vehicle by detecting and correcting misalignment of a mounting angle or an error of a measurement angle generated for the plurality of radars mounted at the rear side of the vehicle while travelling, thereby promoting safe driving. Particularly, the alignment function is automatically operated while the vehicle travels, so that it is possible to decrease a time for repairing a problem due to an abnormal operation.

The radar alignment apparatus for a vehicle according to the exemplary embodiment and the method of controlling the same are not applied to be limited by the aforementioned configuration and method of the exemplary embodiments, but the entirety or a part of the exemplary embodiments may be selectively combined so that various modifications of the exemplary embodiments may be made.

The radar alignment apparatus and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. In this manner, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. As such, the radar alignment apparatus and/or one or more components thereof may include or otherwise be associated with one or more memories (not shown) including code (e.g., instructions) configured to cause the radar alignment apparatus and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A method of controlling a radar alignment apparatus, comprising:
    calculating a first target information comprising a first distance to, a first speed, and an first angle of a first target by using a first radar provided on a vehicle;
    calculating a second target information comprising a second distance to, a second speed, and a second angle of a second target by using a second radar provided on the vehicle and spaced apart from the first radar by a predetermined interval;
    comparing the first distance and the first speed included in the first target information with the second distance and the second speed included in the second target information;
    determining whether the first target and the second target are a same target based on the comparison of the first distance with the second distance and the first speed with the second speed;
    comparing the first angle included in the first target information with the second angle included in the second target information when it is determined that the first target and the second target are the same target;
    determining whether misalignment exists in at least one of the first radar and the second radar based on the comparison of the first angle with the second angle;
    correcting the misalignment by using the first distance included in the first target information and the second distance included in the second target information when it is determined that the misalignment exists in at least one of the first radar and the second radar; and
    outputting a warning message corresponding to the first target information and the second target information when it is determined that the misalignment does not exist in at least one of the first radar and the second radar,
    wherein the misalignment is determined to exist in at least one of the first radar and the second radar when a difference between the first angle included in the first target information and the second angle included in the second target information is equal to or larger than a third reference value.

2. The method of claim 1, wherein correcting of the misalignment comprises:
    calculating a first calculated angle of the same target to the first radar and a second calculated angle of the same target to the second radar by using the first distance included in the first target information, the second distance included in the second target information, and the interval between the first radar and the second radar;
    calculating each of a first correction value that is a difference between the first calculated angle of the same target to the first radar and the first angle included in the first target information, and a second correction value that is a difference between the second calculated angle of the same target to the second radar and the second angle included in the second target information; and
    correcting the first angle included in the first target information by using the first correction value, and correcting the second angle included in the second target information by using the second correction value.

3. The method of claim 1, wherein determining whether the first target and the second target are the same target comprises:

determining that the first target and the second target are the same target when a difference between the first distance included in the first target information and the second distance included in the second target information is equal to or smaller than a first reference value; and when a difference between the first speed included in the first target information and the second speed included in the second target information is equal to or smaller than a second reference value.

4. The method of claim 1, wherein determining whether the misalignment exists in at least one of the first radar and the second radar comprises:

determining that the misalignment exists in at least one of the first radar and the second radar when a difference between the first angle included in the first target information and the second angle included in the second target information is equal to or larger than a third reference value.

5. The method of claim 1, further comprising:

determining whether the first distance included in the first target information and the second distance included in the second target information is equal to or larger than a reference distance when it is determined that the misalignment exists in at least one of the first radar and the second radar;

determining whether a number of times of determination that the misalignment exists in at least one of the first radar and the second radar is equal to or larger than a predetermined number of times when the first distance included in the first target information and the second distance included in the second target information is equal to or larger than the reference distance; and correcting the misalignment when it is determined that the number of times of determination that the misalignment exists in at least one of the first radar and the second radar is equal to or larger than the predetermined number of times.

6. The method of claim 2, wherein correcting of the misalignment further comprises:

accumulating the first correction value and the second correction value a predetermined number of times; and filtering accumulated first correction values and second correction values according to a predetermined reference.

7. An apparatus for aligning radars, comprising:

a first radar and a second radar provided on a vehicle and spaced apart from each other by a predetermined interval, the first and second radars radiate first and second radio waves for detecting a first target and a second target;

a receiving unit configured to receive a first signal of the first radio wave radiated by the first radar and reflected from the first target, and a second signal of the second radio wave radiated by the second radar and reflected from the second target;

a target information calculating unit configured to calculate a first target information comprising a first distance to, a first speed, and a first angle of the first target, and a second target information comprising a second distance to, a second speed, and a second angle of the second target based on the first and second signals received by the receiving unit;

a target information comparing unit configured to compare the first distance and the first speed included in the first target information with the second distance and the second speed included in the second target information, the target information comparing unit also configured to determine whether the first target and the second target are a same target;

an alignment correcting unit configured to compare the first angle included in the first target information with the second angle included in the second target information and determine whether misalignment exists in at least one of the first radar or the second radar when it is determined that the first target and the second target are the same target, and calculate a correction value for correcting the misalignment by using the first distance included in the first target information with the second distance included in the second target information when it is determined that misalignment exists in at least one of the first radar and the second radar;

a warning unit configured to output a warning message corresponding to the first target information and the second target information when it is determined that the misalignment does not exist in at least one of the first radar and the second radar, and wherein the alignment correcting unit determines that the misalignment exists in at least one of the first radar and the second radar when a difference between the first angle included in the first target information and the second angle included in the second target information is equal to or larger than a third reference value.

8. The apparatus of claim 7, wherein:

the alignment correcting unit is configure to:

calculate a first calculated angle of the first target to the first radar and a second calculated angle of the second target to the second radar by using the first distance included in the first target information, the second distance included in the second target information, and the interval between the first radar and the second radar to a cosine law, and calculate a first correction value that is a difference between the first calculated angle of the first target to the first radar and the first angle included in the first target information, and a second correction value that is a difference between the second calculated angle of the second target to the second radar and the second angle included in the second target information, and the target information calculating unit is configured to correct the first angle included in the first target information by using the first correction value, and correct the second angle included in the second target information by using the second correction value.

9. The apparatus of claim 7, wherein the target information comparing unit is configured to determine that the first target is the same as the second target when a difference between the first distance included in the first target information and the second distance included in the second target information is equal to or smaller than a first reference value, and when a difference between the first speed included in the first target information and the second speed included in the second target information is equal to or smaller than a second reference value.

* * * * *